US007269590B2

(12) United States Patent
Hull et al.

(10) Patent No.: US 7,269,590 B2
(45) Date of Patent: Sep. 11, 2007

(54) METHOD AND SYSTEM FOR CUSTOMIZING VIEWS OF INFORMATION ASSOCIATED WITH A SOCIAL NETWORK USER

(75) Inventors: Mark Everett Hull, San Jose, CA (US); F. Randall Farmer, Palo Alto, CA (US); Ellen Sue Perelman, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 348 days.

(21) Appl. No.: 10/832,172

(22) Filed: Apr. 26, 2004

(65) Prior Publication Data

US 2005/0177385 A1  Aug. 11, 2005

Related U.S. Application Data

(60) Provisional application No. 60/544,639, filed on Feb. 13, 2004, provisional application No. 60/540,505, filed on Jan. 29, 2004.

(51) Int. Cl.
G06F 17/30 (2006.01)
(52) U.S. Cl. .................. 707/10; 707/3; 707/104.1; 709/219
(58) Field of Classification Search ............ 707/3, 707/10, 104.1; 709/219
See application file for complete search history.

(56) References Cited

U.S. PATENT DOCUMENTS

| | | | |
|---|---|---|---|
| 5,835,087 A | 11/1998 | Herz et al. | |
| 5,950,193 A | 9/1999 | Kulkarni | |
| 6,029,141 A | 2/2000 | Bezos et al. | |
| 6,175,831 B1 | 1/2001 | Weinreich et al. | |
| 6,269,369 B1 * | 7/2001 | Robertson | 707/10 |
| 6,327,573 B1 | 12/2001 | Walker et al. | |
| 6,356,879 B2 | 3/2002 | Aggarwal et al. | |
| 6,433,795 B1 | 8/2002 | MacNaughton et al. | |
| 6,449,344 B1 | 9/2002 | Goldfinger et al. | |
| 6,466,917 B1 | 10/2002 | Goyal et al. | |
| 6,606,657 B1 | 8/2003 | Zilberstein et al. | |
| 6,714,931 B1 | 3/2004 | Papierniak et al. | |
| 6,745,178 B1 | 6/2004 | Emens et al. | |

(Continued)

OTHER PUBLICATIONS

"Welcome to the Christian Connection Matchmaker", archive.org website of www.christian.matchmaker.com, Feb. 21, 1999.

(Continued)

Primary Examiner—Leslie Wong
(74) Attorney, Agent, or Firm—Darby & Darby PC; Jamie L. Wiegand (57) ABSTRACT

A method, apparatus, and system are directed towards managing a view of a social network user's personal information based, in part, on user-defined criteria. The user-defined criteria may be applied towards a user's relationship with each prospective viewer. The user-defined criteria may include degrees of separation between members of the social network, a relationship to the prospective viewer, as well as criteria based, in part, on activities, such as dating, employment, hobbies, and the like. The user-defined criteria may also be based on a group membership, a strength of a relationship, and the like. Such user-defined relationship criteria may then be mapped against various categories of information associated with social network user to provide customized views of the social network user.

30 Claims, 5 Drawing Sheets

U.S. PATENT DOCUMENTS

| | | | |
|---|---|---|---|
| 6,879,994 | B1 | 4/2005 | Matsliach et al. |
| 6,993,325 | B1 | 1/2006 | Waesterlid |
| 2002/0023132 | A1 | 2/2002 | Tornabene et al. |
| 2002/0023230 | A1 | 2/2002 | Bolnick et al. |
| 2002/0059201 | A1* | 5/2002 | Work .......................... 707/3 |
| 2002/0099806 | A1 | 7/2002 | Balsamo et al. |
| 2002/0116466 | A1 | 8/2002 | Trevithick et al. |
| 2002/0124053 | A1* | 9/2002 | Adams et al. .............. 709/216 |
| 2003/0050977 | A1 | 3/2003 | Puthenkulam et al. |
| 2003/0074440 | A1* | 4/2003 | Grabarnik et al. .......... 709/224 |
| 2003/0158855 | A1* | 8/2003 | Farnham et al. ............ 707/102 |
| 2003/0167324 | A1 | 9/2003 | Farnham et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0107242 | A1* | 6/2004 | Vert et al. ................... 709/203 |
| 2004/0119760 | A1* | 6/2004 | Grossman et al. .......... 345/854 |
| 2004/0122681 | A1* | 6/2004 | Ruvolo et al. ................. 705/1 |
| 2004/0122803 | A1 | 6/2004 | Dom et al. |
| 2004/0122855 | A1 | 6/2004 | Ruvolo et al. |
| 2004/0148275 | A1* | 7/2004 | Achlioptas ..................... 707/3 |
| 2004/0215648 | A1 | 10/2004 | Marshall et al. |
| 2004/0215793 | A1* | 10/2004 | Ryan et al. ................. 709/229 |

OTHER PUBLICATIONS

"The Purpose Principles and Process", archive.org website of www.christian.matchmaker.com, Feb. 24, 1999.

"A Sneak Preview of the Christian Connection Matchmaker Search Page", archive.org website of www.christian.matchmaker.com, May 8, 1999.

"A Sneak Preview of the Christian Connection Matchmaker Match Page", archive.org website of www.christian.matchmaker.com, Feb. 23, 1999.

"Yahoo! Groups-What is a Group?", archive.org website of www.yahoo.com, Nov. 3, 2002.

"Yahoo! Groups-Getting Started, Groups Account, Groups Features", archive.org website of www.yahoo.com, Oct. 31, 2002.

"Yahoo! Groups-What is the spam policy of Yahoo! Groups? How do I avoid spam?", archive.org website of www.yahoo.com, Oct. 24, 2002.

Merrick, Amy; "The Best Way to . . . Find a Date—OK, so true love isn't guaranteed; But there are ways to better the odds", Wall Street Journal, New York, NY, p. R 16, ProQuest ID 64669169, Nov. 27, 2000.

Member site Selection Page for Matchmaker.com, web.archive.org webpage of Feb. 19, 1999, web.archive.org/web/19990219183131/matchmaker.com/newtry.shtml.

Welcome to the Christian Connection Matchmaker, web archive.org webpage of Feb. 22, 1999, web.archive.org/web/19990222170152/http://www.Christian.email.net/index/html.

Matchmaker.com Disclaimer, web.archive.org webpage of Apr. 20, 2000, web.archive.org/web/20000420114350/www.Christian.matchmaker.com/rules.

Lorrie Faith Cranor et al., "Spam," Communications of the ACM, Aug. 1998, pp. 74-83, vol. 41, No. 8.

Richard V. Dragan, "Tribe.net (beta)," PC Magazine, Jan. 20, 2004, <http//:www.pcmag.com/article2/0,1759,1418688,00.asp>.

Jason Ethier, "Current Research in Social Network Theory," <http://upaya.soc.neu.edu/archive/students/Ethier-SocialNetworks.html>.

Matt Hines, "AOL serves up software for BREW", Dec. 9, 2003<http://news.com.com/2100-1038-5117686.html>.

Matt Hines, "America Online proposes Love.com," Dec. 10, 2003<http://news.com.com/2100-1032-5118986.html>.

Timothy J. Mullaney, "Diller's Latest Little Bet on the Net", BusinessWeek Online, Mar. 1, 2004,<http://www.businessweek.com:/print/technology/content/mar2004/tc20004031_2820_tc119.h . . . >.

"FAQs About the ZeroDegrees Service," visited on Sep. 8, 2004, <http://www.zerodegrees.com/faq.htm>.

Jordan et al., "The Augmented Social Network: Building identity and trust into the next-generation internet", first monday Peer-Reviewed Journal on the Internet, www.firstmonday.dk/issues/issue8_8/jordan/, pp. 1-64.

International Search Report, mail date Oct. 3, 2006 of International Application No. PCT/US04/38696.

International Preliminary Report on Patentability dated Dec. 14, 2006 issued for corresponding International Patent Application No. PCT/US2004/038703.

Written Opinion dated Oct. 3, 2006, for International Application PCT/US04/38696, filed Nov. 17, 2004.

"System Names and Numbers," archive.org website of www.christian.matchmaker.com, Apr. 24, 1999, pp. 1-3 (Feb. 15, 2007).

"Matchmaker User Tools Pages," archive.org website of www.christian.matchmaker.com, Apr. 24, 1999, pp. 1-2. (Feb. 15, 2007).

"Matchmaker Help—Block," archive.org website of www.christian.matchmaker.com, Sep. 10, 1999, p. 1. (Feb. 15, 2007).

"Matchmaker Help—Main Page," archive.org website of www.christian.matchmaker.com, Oct. 4, 1999, p. 1-3. (Feb. 15, 2007).

* cited by examiner

METHOD AND SYSTEM FOR CUSTOMIZING VIEWS OF INFORMATION ASSOCIATED WITH A SOCIAL NETWORK USER

CROSS REFERENCE TO RELATED APPLICATIONS

This application claims the benefit of U.S. Provisional Application, titled "System and Method for Social Networking," Ser. No. 60/544,639, filed on Feb. 13, 2004, and U.S. Provisional Application, titled "System and Method for Social Networking," Ser. No. 60/540,505, filed on Jan. 29, 2004, the benefit of the earlier filing date of which is hereby claimed under 35 U.S.C. § 119(e).

FIELD OF THE INVENTION

The present invention relates generally to computing software for managing a social network view, and more particularly to a method and system for customizing views of a social network user.

BACKGROUND OF THE INVENTION

Social networking includes a concept that an individual's online personal network of friends, family colleagues, coworkers, and the subsequent connections within those networks, can be utilized to find more relevant connections for dating, job networking, service referrals, activity partners, and the like. Because individuals are more likely to trust and value the opinions from people they know than from complete strangers, social networking is typically directed towards mining these network relationships in a way that is often more difficult to do offline.

Thus, there has been a flurry of companies launching services that help people to build and mine their personal networks. However, these efforts have been predominately directed towards dating and job opportunities. Many of these companies are struggling with developing additional services that will build customer loyalty. Without the ability to extend the value of the existing networks, social networking loses its appeal. Thus, there is a need in the industry for better mechanisms to manage, mine, and cultivate personal networks. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The phrase "in one embodiment," as used herein does not necessarily refer to the same embodiment, although it may. Similarly, the phrase "in another embodiment," as used herein does not necessarily refer to a different embodiment, although it may.

The term "based on" is not exclusive and provides for being based on additional factors not described, unless the context clearly dictates otherwise.

Briefly stated, the present invention is directed towards providing a system, apparatus, and method for managing a view of a social network user's personal information based, in part, on user-defined criteria. The user-defined criteria may be applied towards a user's relationship with each prospective viewer. The user-defined criteria may include degrees of separation between members of the social network, a relationship to the prospective viewer, as well as criteria based, in part, on activities, such as dating, employment, hobbies, and the like. Such user-defined relationship criteria may then be mapped against various categories of information associated with social network user to provide customized views of the social network user. Such customized views may be employed to portray various person as to other users of the social network, and to enhance one's own overall value of the social networking experience. Moreover, employing such categories may minimize the likelihood of spam mailings. For example, a category may be employed for use in a spam filter, and the like, by determining whether the sending is a member of a category.

In one embodiment, the user may establish a basic profile that includes a predetermined set of information about the user. A category may be established that has associated with it a set of user specified category profile information about the user. The category profile information and the basic profile information may then be employed to present a customized view of the user for that category.

Additionally, the user may elect to join an activity, such as a job search activity, religious activity, and the like. Activity profile information may be established based, in part, on a globally defined set of social network user information, to encourage a community sharing of common information related to the activity. Profile information may then be provided that is employable to present potentially yet another view of the user.

In another embodiment, the user may further rate a strength of a relationship between themselves and another social network user. The other social network user may then be permitted to view selected profile information based on the relationship strength.

In still another embodiment, profile information may be made available based, in part, on an affiliation of the other social network user to an online group, such as a Yahoo! group, and the like, an offline group, such as a fishing club, and the like.

Illustrative Operating Environment

Figure 1:
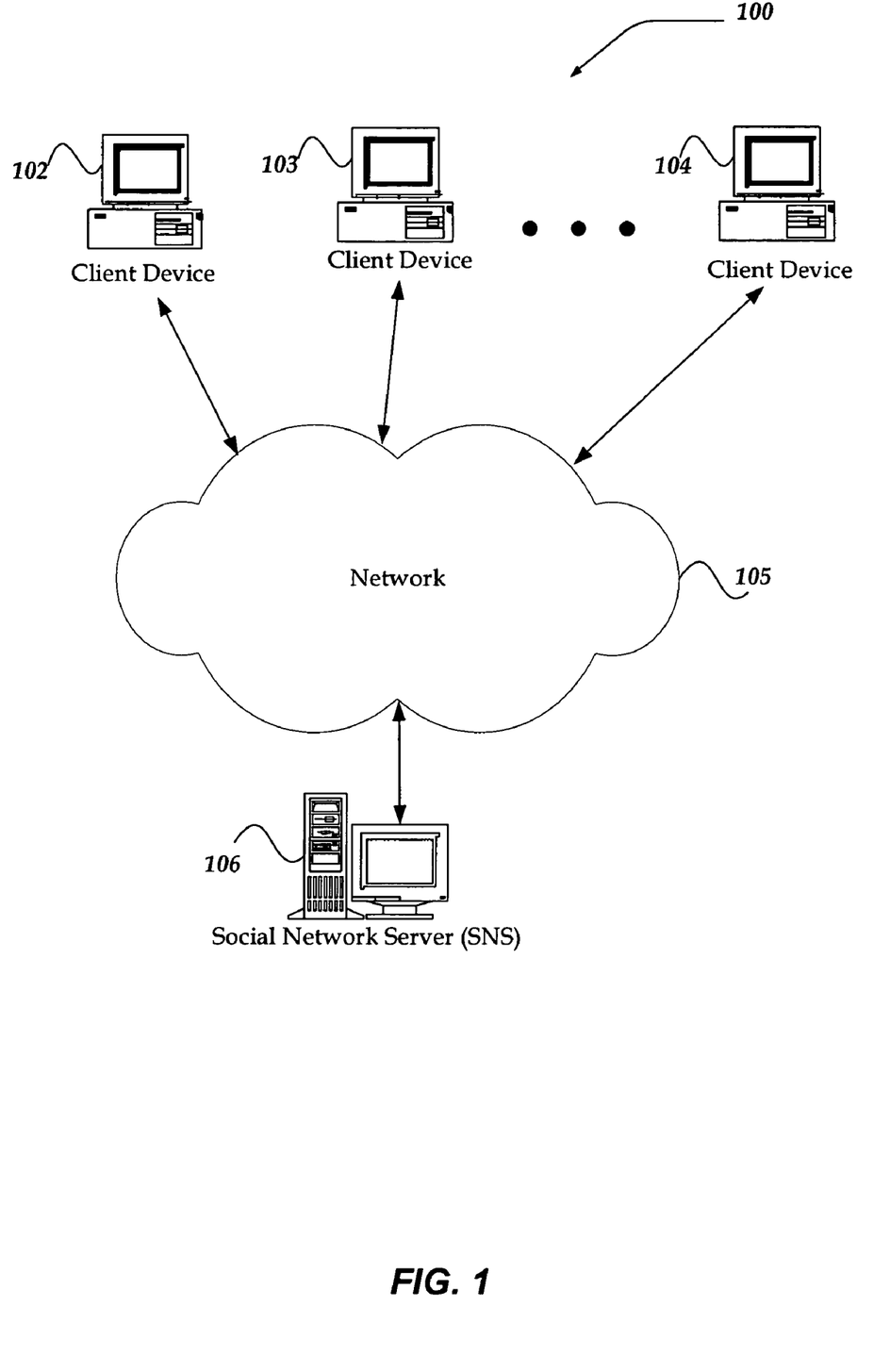
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, and social network server (SNS) 106. Network 105 is in communication with and enables communication between each of client devices 102-104, and SNS 106.

Client devices 102-104 may include virtually any computing device capable of receiving and sending a message over a network, such as network 105, to and from another computing device, such as SNS 106, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

Figure 3A:
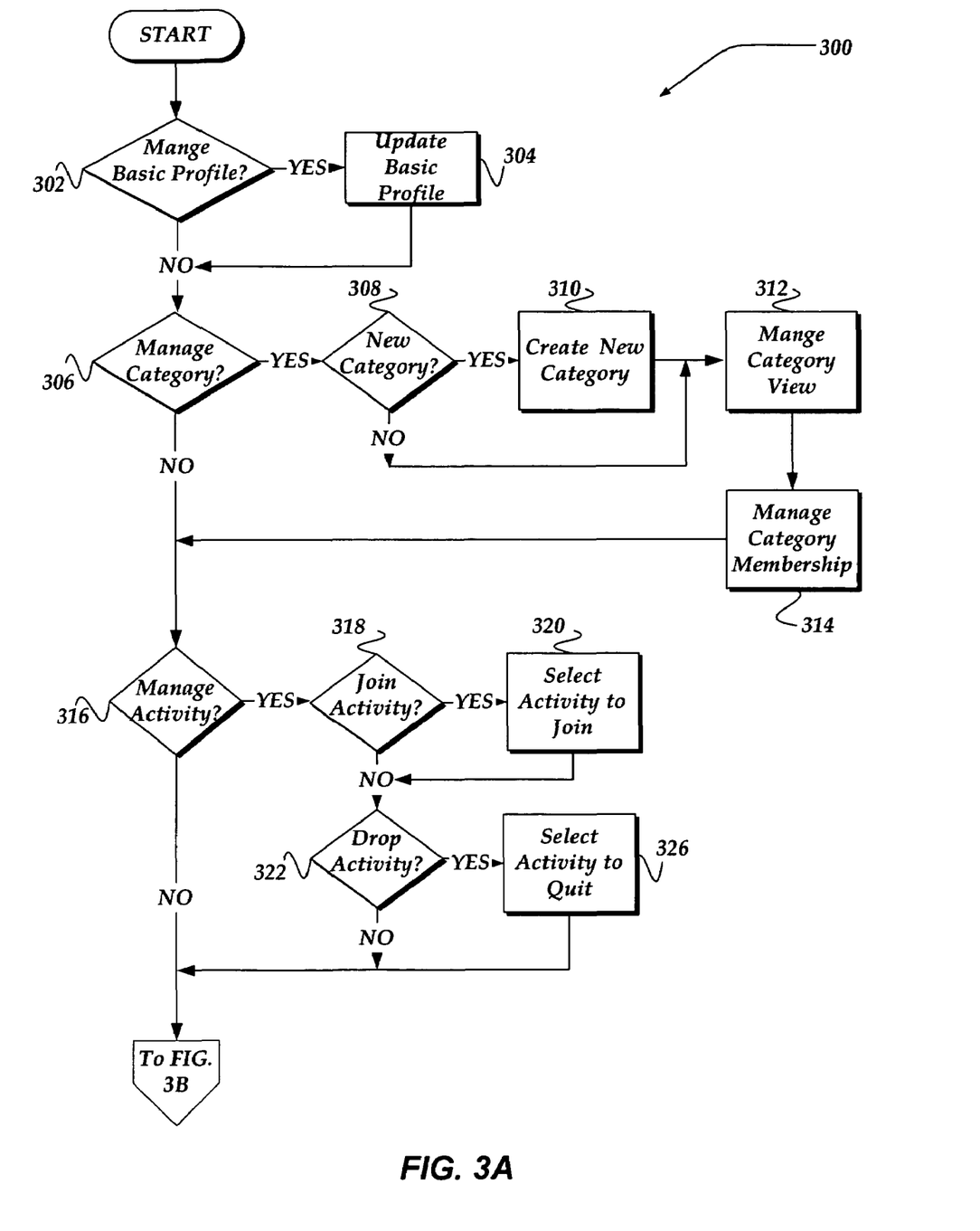
FIGS. 3A-3B illustrate a logical flow diagram generally showing one embodiment of a process for customizing a view of social network user information.
Figure 3B:
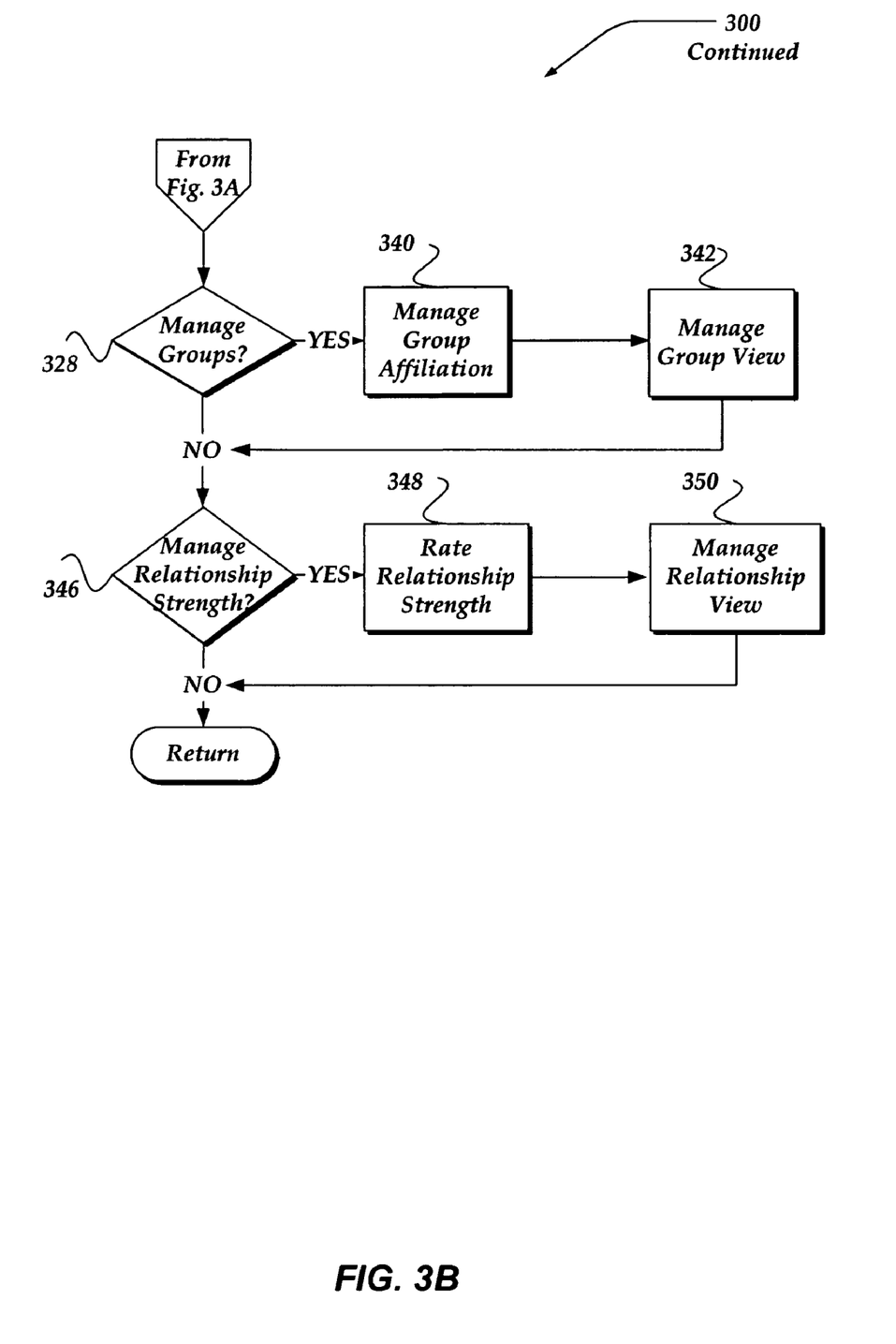

Client devices 102-104 may be further configured to enable a user to manage a user profile, category information, activity participation, and the like, which may in turn be saved at a remote location, such as SNS 106, and the like. As such, client devices 102-104 may further include a client application that is configured to manage various actions on behalf of the client device. For example, the client application may enable a user to interact with the browser application, email application, and the like, to customize how another social network user might view a persona, profile, or the like associated with the user. For example, the user may employ the client application, in part, to provide one customized view for family members, another customized view for poker members, yet another view for fishing buddies, and the like. The client application may interact with a process such as described below in conjunction with FIG. 3 to customize and manage such views.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, and SNS 106.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SNS 106 is described in more detail below in conjunction with FIG. 2. Briefly, however, SNS 106 may include any computing device capable of connecting to NETWORK 105 to manage a customization of a view associated with a social network user, such as a user of at least one of client devices 102-104. Devices that may operate as SNS 106 include personal computers desktop computers, multiprocessor systems, microprocessor-based or programmable consumer electronics, network PCs, servers, and the like.

SNS 106 may be configured to receive information associated with a user and to enable the user to customize a view based in part, on the received information. The received information may include, but is not limited to, profile information, category information, an activity, membership information associated with a category, and the like.

SNS 106 may further employ the received information to enable the user to customize a view associated with a social network perspective based, in part, on received criteria. By providing customized views, the user may put forth different online profiles, public person as, and the like, by sharing varying quantities of personal information with another social network user. The received criteria employed to enable customization of the views may include, but is not limited to, degrees of separation, category of relationship (such as friend, family, colleague, and the like), as well as any assessment of closeness, trust, and the like, based on information about the relationship between the user and the prospective viewer, and the like. The received criteria may further include a permission to view selected information based on a relationship strength, an offline group affiliation, an online group affiliation, and the like.

SNS 106 may also enable another social network user, such as a user of one of client devices 102-104, to view the customized view based on the received criteria. SNS 106 may employ a web service, email service, and the like, to make the customized view available to the other social network user, as appropriate.

SNS 106 may employ processes such as described in more detail below in conjunction with FIGS. 3-4 to manage the customized views.

Illustrative Server Environment

Figure 2:
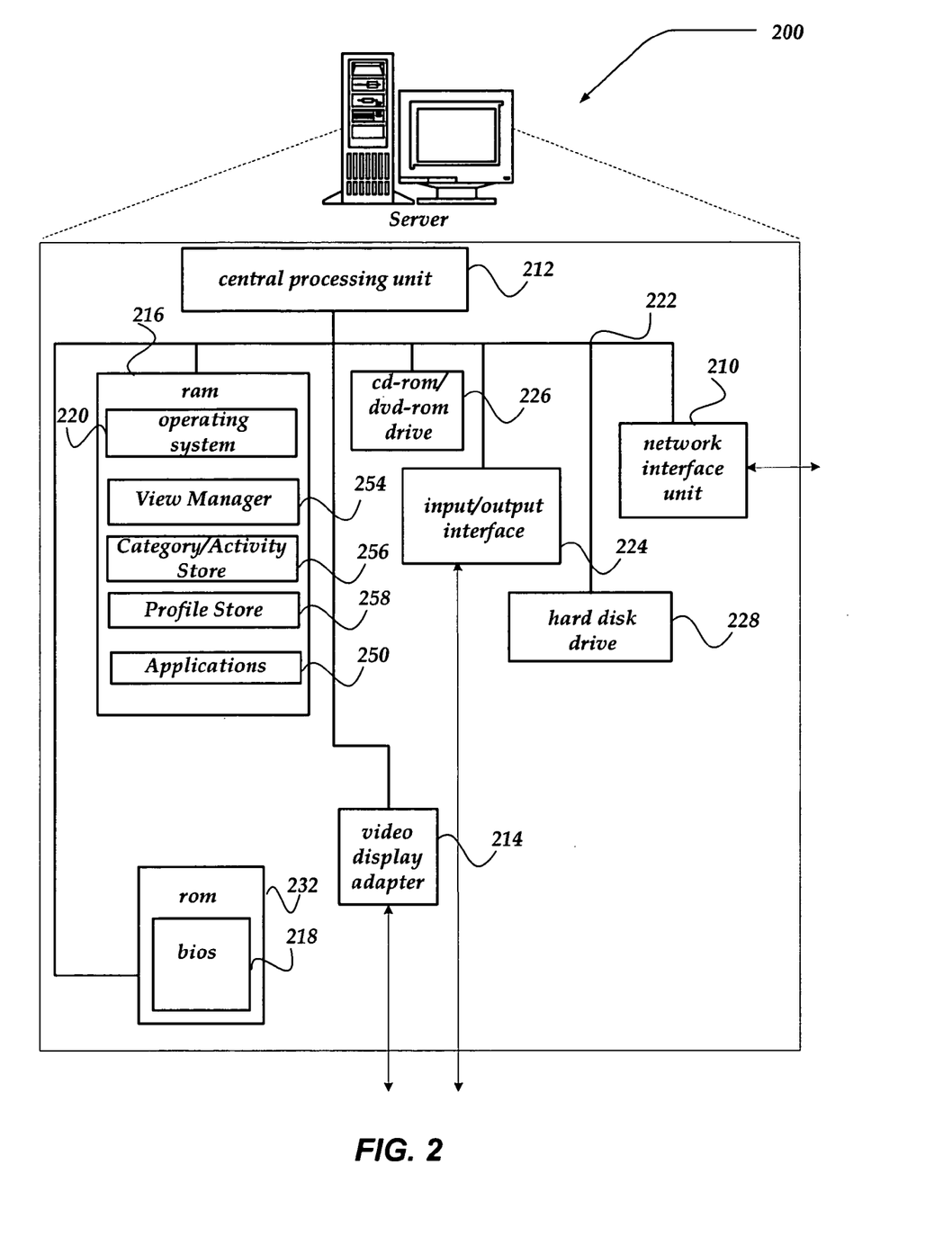
FIG. 2 shows one embodiment of a server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as view manager 254, category/activity store 256, and profile store 258.

Category/activity store 256 may include a database, text, folder, file, and the like, that is configured to maintain and store information that identifies a category, activity, and the like. While category/activity store 256 may store identification information, profile store 258, described below, may store profile and criteria information for each social network user.

A category may represent a classification of users within a user's social network, such as friends, co-workers, poker buddies, family, fishing buddies, and the like. Typically, social network users establish their own categories and profile information based on the category may be accessible to those identified by the creating social network user. However, the invention is not so limited, and global categories may be established that provide profile information about a social network user to virtually any other social network user. Each category may include a set of user-definable social network user information. When the category is user-definable, the set of social network user information (profile information) may also be user-definable. For example, the user may determine that social network user information associated with hobbies may be included in a category for sports, while it may be excluded from a category associated with religion, and the like.

Category/activity store 256 may further include information associated with a group affiliation. For example, the user may establish groupings that enable another social network user to view selected profile information based on whether the other social network user is affiliated with a predetermined group. Such group affiliations may include, but are not limited to, online groups, such as a Yahoo! group, and the like, as well as an offline group, such as Fly Fishing club, a chess club, a bridge club, a bowling group, and the like.

An activity may include virtually any way, manner, and the like, in which a social network user may select to employ their social network connections. For example, activities may include, but are not limited to, dating, careers, military, alumni, help, advice, expertise, and the like. Typically, an activity may be employed by other social network users, even though they are not a member of the activity. As such, it may be desired, although not required, that an activity be globally configured and managed. Additionally, at least a minimum set of profile information associated with the activity may be globally established. For example, if the activity includes dating, the minimum set of profile information, may include, but is not limited to age, sexual preference, information associated with one's physical appearance, and the like. If the activity includes job search, employment search, and the like, the minimum set of profile information may include, but is not limited to, job history, salary desired, job qualifications, experience, and the like. However, an activity may further include an optional set of profile information, such as achievements, hobbies, recommendations, and the like. Moreover, membership to an activity may also be employed to determine whether a message is spam.

Profile store 258 may include a database, text, folder, file, and the like, that is configured to maintain and store a profile associated with a social network user. A profile may include information associated with the social network user. For example, the profile may include, but is not limited to such information as the social network user's name, alias, nickname, age, email address, and the like. In one embodiment, a collection of such information may be arranged to provide a basic profile for the social network user. Additional information may also be included in profile store 258 that includes category profile information, activity profile information, group profile information, relationship strength profile information, and the like. Such additional information may include, but is not limited, to a photograph, a hobby, a job history, a school history, career information, dating information, military information, sports information, religious information, sexual orientation, politics, interests, favorite sites, self-description, and the like. The additional information may further include such online status, including, but not limited to a current audio file being played, such as a current song, or the like, a favorite picture, a favorite group, blog, journal entry, file, update on a friend, and the like. In one embodiment, at least some information includes a Universal Resource Locator (URL). Virtually any information associated with the social network user may be included within profile store 258.

Moreover, profile store 258 may store and maintain criteria associated with how profile information may be viewed by another social network user. For example, profile store 258 may include criteria indicating that only a member of a particular category may view a particular photograph, a subset of profile information, and the like. While information may be selected at a field by field level of granularity, the present invention however, is not so limited. For example, the present invention enables the social network user to establish criteria that is based on a relationship between the prospective viewer and the user. The relationship criteria may then be employed to map various collections, groupings, sets, and the like, of profile information, rather than merely toggling on/off individual viewers for all the profile information or individual profile fields. As such, the social network user, for example, may establish criteria such that any other social network user that is within some predetermined degrees of separation may view a predetermined set of profile information.

Moreover, the social network user may further establish criteria that such that any other social network user that has a user-definable relationship strength may view a predetermined set of profile information. For example, the social network user may establish criteria that allow any other social network user with a relationship strength of 'close friend," to view more profile information, than a social network user that has a relationship strength of "acquaintance." However, the invention is not limited to the examples for relationship strengths, and virtually any criteria, rating, and the like, may be employed to enable viewing of profile information based on relationship strength.

The social network user may also establish criteria that enable viewing of another predetermined set of profile information based, in part, on a group affiliation. For example, criteria may be established that allows a member of a pre-defined group to view selected profile information. Such group affiliations may be determined employing any of a variety of mechanisms, including but not limited to, requesting such information from another social network user, examining a predetermined file, database, repository, and the like.

View manager 254 is configured to enable a social network user to manage their information within profile store 258 and category/activity store 256. View manager 254 may further enable another social network user to view a profile based in part, on predetermined criteria as described above. As such, view manager 254 may employ processes such as described in more detail below in conjunction with FIGS. 3-4 to manage customized views of the social network user.

Although illustrated in FIG. 2 as distinct components in server 200, view manager 254, category/activity store 256, and profile store 258 may be arranged, combined, and the like, in any of a variety of ways, without departing from the scope of the present invention. For example, category/activity store 256 may be arranged as separate components, such as an activity store and a category store, or the like. Moreover, view manager 254, category/activity store 256, and profile store 258 may reside in one or more separate computing devices, substantially similar to server 200.

Server 200 may also include an SMTP handler application to interface with DEA manager 254 for transmitting and receiving email. Server 200 may also include an HTTP handler application for receiving and handing HTTP requests, and an HTTPS handler application for handling secure connections. The HTTPS handler application may initiate communication with an external application in a secure fashion.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 is utilized by server 102 to store, among other things, application programs, databases, view manager 254, category/activity store 256, profile store 258, and the like.

Generalized Operation

The operation of certain aspects of the present invention will now be described with respect to FIGS. 3-4. Briefly, FIGS. 3A-3B illustrate a logical flow diagram generally showing one embodiment of a process for enabling social network users to customize a view of their profile information. Process 300, which spans FIGS. 3A-3B, may be implemented, for example, within SNS 106 of FIG. 1, and accessed employing a client device, such as client devices 102-104 of FIG. 1.

Process 300 is typically entered when a social network user that is registered to employ the customization process indicates intent to manage a view of their profile. Thus, process 300 begins, after a start block, at decision block 302, where a determination is made whether the social network user wishes to manage their basic profile. Typically, if the social network user has not provided basic user profile information, such as when the user has just registered, or the like, then the answer to decision block 302 may be yes. In any event, if it is determined that the social network user is to manage their basic profile, processing branches to block 304; otherwise, processing continues to decision block 306.

In one embodiment, the user profile may be created quickly by automatically importing predetermined user data from a variety of sources, including, but not limited to, the user's email address book, group associations, and the like.

At block 304, the social network user may update their basic profile. Updates may include, modifying basic profile information about themselves, including age, gender, email address, interests, and the like. Basic profile information is not limited to these items, however, and others may be included, substituted, or the like, without departing from the scope of the invention. In any event, upon updating the basic profile information, process 300 continues to decision block 306.

At decision block 306, a determination is made whether the social network user is to manage a category. As described above, a category includes a classification of social network users within an individual user's social network. Typically, the social network users are within the user's first degree of separation, such as friends, soccer teammates, co-workers, family, and the like. A degree of separation is one criterion that may be employed to represent a relationship between social network users. Degrees of separation for example, may indicate that the two social network users have a direct relationship, such as through direct email correspondences, inclusion of each other's email addresses within one's address book, or the like. Higher degrees of separation may indicate a further removed relationship, such as a friend of a friend, and the like. Thus, the present invention is not limited to first degrees of separation, and higher degrees may be employed without departing from the scope of the invention. Such categories are directed towards providing a convenient mechanism to organize one's connections, and control information that is revealed to others, to efficiently manage communications, such as enabling email to all social network members in one's soccer teammate's category, and the like. Moreover, categories may be employed to minimize the likelihood of receiving spam. For example, a category may be employed to minimize access to information. A category may also be employed in conjunction with a spam filter to determine whether a message is from a member of a category. However, use of a category is not limited to these spam examples, and others may be employed without departing from the scope of the invention. As such, managing a category includes the ability to create, edit, and delete a user specified category. In any event, if the determination is to manage a category, processing branches to decision block 308; otherwise, processing proceeds to decision block 316.

At decision block 308, a determination is made whether the user indicates an intent to create a new category. If the user indicates intent to create a new category, processing proceeds to block 310, where the new category is created; otherwise, processing branches to block 312. Creation of a new category may include providing a name to the category, a description of the category, and the like. The category may also be created when another social network user includes the current user in their social network. Processing next proceeds to block 312.

At block 312, criteria may be created, modified, and the like, that establishes the type of information a member of the category may view. For example, criteria may be established that enables one category to view any profile information associated with employment, but not religion, or the like. Criteria may be established that enables another category to view selected photographs, sets of photographs, and the like, while another category may be unable to view any photographs. Criteria may also be established that enables a category to view one's hobbies, information associated with selected hobbies, and the like, while another category may be unable to view other information associated with hobbies. For example, a category may have been created for one's fishing buddies and another category for one's religious membership. Criteria may then be established that enables the fishing buddy category to view any information associated with hobbies, sports, and the like, including recent purchases and recommendations associated with hobbies. However, hobby information might be screened from being viewable by members of one's religious category. The above are merely examples, as the possibilities are virtually endless as how one may wish to establish criteria for viewable information. Unlike traditional implementations, the present invention enables a social network user to establish criteria based on relationship criteria, such as degrees of separation, and the like that maps against various categories of information, such as hobby information, and the like. As such, by applying the criteria to viewable information by a category, one may minimize the likelihood of receiving spam.

Processing continues next to block 314, where membership to the category is managed. Based, in part, on the criteria, membership may be added or deleted. For example, membership to a category may have been established based on a relationship, such as any person within two degrees of separation from this other person. However, membership is not constrained to this example, and virtually any criteria, and the like, may be employed to determine membership to a category. Additionally, membership may be obtained from virtually any source, including, but not limited to, one's email address book, another's address book, a buddy list, a database, an association, and the like. Membership may also be revised based on additional user input at this block, including revising selected member participation, further revising membership criteria, other connections between online portal subscribers, and the like. In any event, upon completion of block 314, processing proceeds to decision block 316.

At decision block 316, a determination is made whether the user indicates an intent to manage membership within an activity. If the user indicates intent to manage membership within an activity, processing continues to decision block 318; otherwise, process 300 flows to decision block 328 of FIG. 3B.

At decision block 318, a determination is made whether the user indicates intent to join an activity. Activities are typically predetermined so as to enable other social network users to perform searches, make inquiries, receive messages, and the like. As such, activities are typically, but not necessarily, accessible to virtually any social network user that wishes to join. Moreover, activities are typically, but not necessarily, managed by other than the single user. Thus, if the user indicates intent to join an existing activity, processing continues to block 320, where the user is presented with at least one predetermined activity for which the user may join. Otherwise, if the user does not intend to join an activity, processing continues to decision block 322. Such activities may include, but are not limited to, dating, careers, military, alumni, help, advice, expertise, and the like. Upon completion of block 320, processing continues to decision block 322.

At decision block 322, a determination is made whether the user indicates an intent to be removed from an activity for which the user is already a member. If so, processing proceeds to block 326, where the user selects the activity from which the user indicates intent to be removed. Upon completion of block 326, or if the answer is not to drop an activity, processing flows to decision block 328 of FIG. 3B.

At decision block 328 of FIG. 3B, a determination is made whether the user indicates an intent to manage a group affiliation. If so, processing proceeds to block 340; otherwise, processing branches to decision block 346.

At block 340, a group affiliation is identified. The user may provide the group affiliation based on an online group, club, and the like, based on an offline group, club, association, and the like. For example, a group affiliation may be based on another's affiliation to an offline fly-fishing club, a chess club, an online fly-fishing club, a group such as a Yahoo! group, and the like. Virtually any affiliation may be employed to establish group affiliation criteria. Upon completion of block 340, processing continues to block 342.

At block 342, group criteria may be created, modified, and the like, that establishes the type of information a group affiliation established in block 340 may view. For example, the group criteria may be established that enables a member of the predetermined group to view one's hobbies associated with the subject of that group. For example, where the group is associated with chess, the group criteria may enable viewing of books one purchased on the subject of chess. However, the invention is not so limited, and virtually any group criteria may be established based on a group affiliation to in turn establish group profile information. Upon establishing the group profile information at block 342, processing flows to decision block 346.

At decision block 346, a determination is made whether a relationship strength is to be managed. If so, processing flows to block 348; otherwise, processing returns to a calling process to perform other actions.

At block 348, a relationship strength is rated. Virtually any rating of a relationship may be employed. In one embodiment, however, a rating is based on inputting a criterion, for another social network user. For example, a rating may be applied that distinguishes a "close friend" from a "casual acquaintance," and the like. Upon completion of block 348, process 300 flows to block 350, where a relationship strength criteria is managed that provides a view of one's profile information based on the relationship strength identified at block 348. For example, the criteria may enable the social network user that has a relationship strength of "close friend" to view more intimate profile information that another social network user. In any event, upon completion of block 350, processing returns to the calling process to perform other actions.

Figure 4:
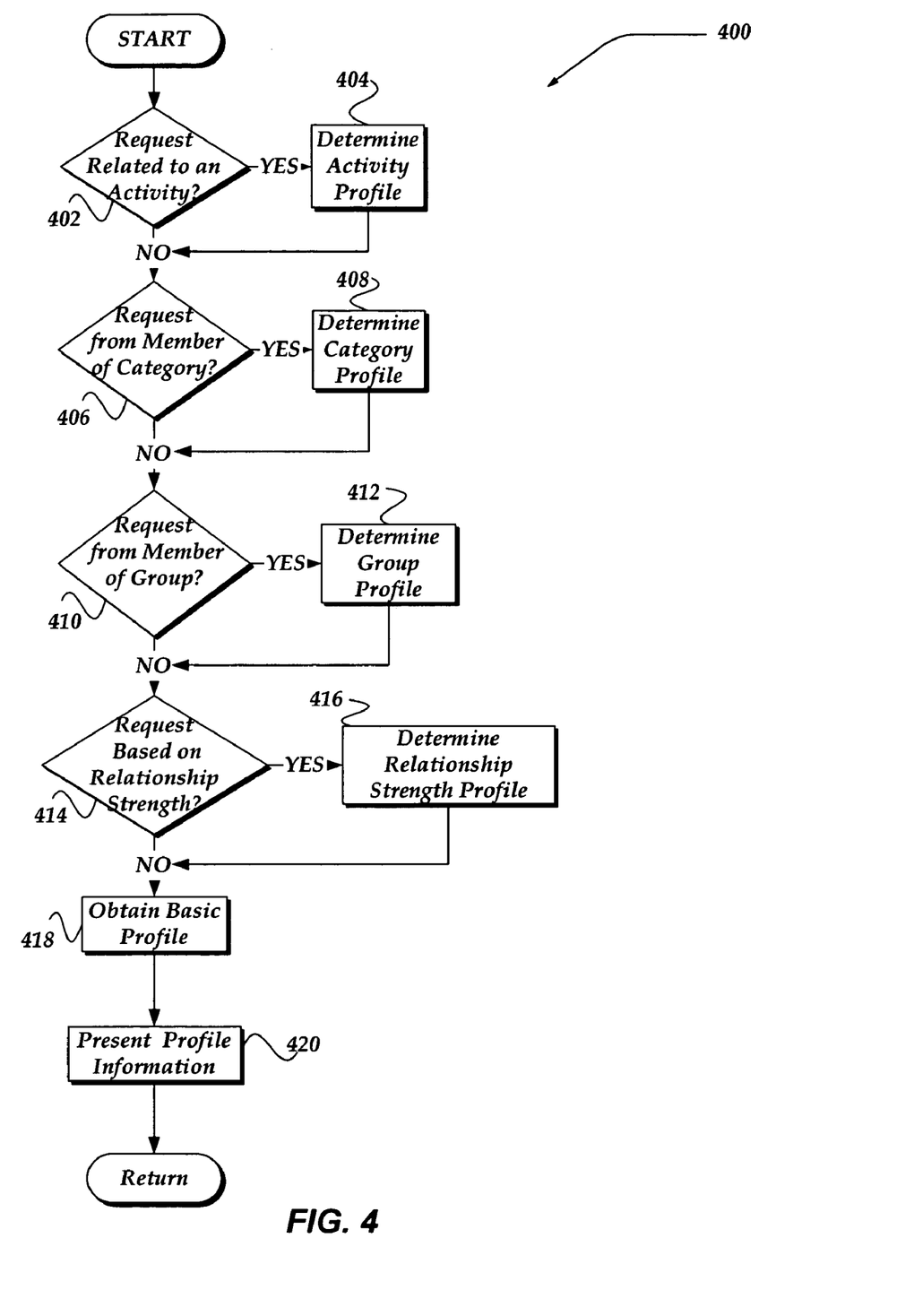
FIG. 4 illustrates a logical flow diagram generally showing one embodiment of a process for providing a customized view of social network user information, in accordance with the present invention.

FIG. 4 illustrates a logical flow diagram generally showing one embodiment of a process for managing a customized view of a social network user's profile information. Process 400 of FIG. 4 may be implemented, for example, on SNS 106 of FIG. 1.

Process 400 is typically entered when a social network user provides a request to view another social network user's profile information.

Thus, process 400 begins, after a start block, at decision block 402, where a determination is made whether the request is related to an activity. If the request is related to an identified activity processing proceeds to block 404 where the activity is determined; otherwise, processing flows to decision block 406.

At block 404, determination of the identified activity may include, confirming that the profile requested is associated with a member of the identified activity. If it is, then the activity profile information associated with the identified activity is retrieved. Processing then continues to decision block 406.

At decision block 406, a determination is made whether the request for the user profile information is from a member of a category established, in part, by the user. If the request is not from a member of an established category, processing proceeds to decision block 410; otherwise processing continues to block 408. At block 408, the category is determined, for which the requesting user is a member. Determination may include a determination of additional profile information based, in part, on established criteria, category identified profile information, and the like. The determined category profile information is then retrieved. Processing continues to decision block 410.

At decision block 410, a determination is made whether the request is from a user affiliated with a predetermined group. If the request is from a user affiliated with a predetermined group, processing flows to block 412; otherwise, processing continues to decision block 414. At block 412, the group is determined, for which the requesting user is affiliated. Determination of such affiliation may include a determination of additional profile information based, in part, on established criteria for the group. For example, the group criteria may include whether selected profile information is provided based on affiliation to one group, to one group but not another group, affiliation with a predetermined set of groups, and the like. In any event, application of the group criteria enables retrieval of group profile information. Processing then flows to decision block 414.

At decision block 414, a determination is made whether profile information may be made available based on a relationship strength. If it is, processing flows to block 416; otherwise, processing continues to block 418. At block 416, the predetermined relationship strength is employed as criteria to retrieve relationship strength profile information. Processing flows next to block 418.

At block 418, the basic profile information is retrieved. Processing continues next to block 420 where the basic profile information and other retrieved profile information (if there was any) are formatted for presentation to the requesting user. Formatting of the profile information may include eliminating presentation of redundant information, organizing the information, and the like. Upon presentation of the profile information, process 400 returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method of managing social network user information over a network, comprising:

receiving a plurality of social network user information from a user;

receiving a request to view the social network user information from a requesting user;

if the request is related to an activity, determining an activity profile from the social network user information;

if the requesting user is included within a category, determining a category profile from the social network user information; and combining a basic profile and zero or more of the activity profile and the category profile into a display to the requesting user, wherein combining comprises eliminating presentation of redundant information.

2. The method of claim 1, wherein if the request is related to a relationship strength, determining a relationship strength profile from the social network user information; and including the relationship strength profile in the display profile for the requesting user.

3. The method of claim 1, wherein if the requesting user is included within a group, determining a group profile from the social network user information; and including the group profile in the display profile for the requesting user.

4. The method of claim 1, wherein the activity further comprises at least one activity associated with dating, business, military, employment, help, advice, expertise, and alumni.

5. The method of claim 1, wherein combining the display profile further comprises, determining if the requesting user is a member of a user-definable category.

6. The method of claim 1, wherein the display profile further includes at least one of an online status, a current audio file being played, a favorite picture, a favorite group, a journal entry, and a universal resource locator.

7. The method of claim 1, wherein the basic profile further comprises at least one of an age, a name, an alias, a nickname, and an email address associated with the user.

8. A method of managing social network user information over a network, comprising:

receiving a request to view social network user information associated with a requesting user;

if the requesting user is a member of a category, determining a dynamically user-definable set of social network user information;

if the request is associated with an activity for which the requesting user is a member, determining an activity related set of social network user information;

determining a basic set of social network user information;

if the requesting user is associated with a group, determining a group set of social network user information;

if the requesting user is associated with a predetermined relationship strength, determining a relationship strength set of social network user information; and providing at least one of the user-definable set, the activity related set, relationship strength, group, and the basic set of social network user information.

9. The method of claim 8, wherein if the request is from the user associated with the category, further comprises, determining a relationship between the between the user and the requesting user.

10. The method of claim 8, wherein the category further comprises a user-definable category.

11. The method of claim 8, wherein the activity further comprises a globally defined activity.

12. The method of claim 11, wherein the activity is selectable from at least one activity associated with dating, business, military, employment, help, advice, expertise, and alumni.

13. The method of claim 8, wherein determining the basic set of social network user information further comprises determining a globally defined set of information including at least one of an age, a name, an email address, and an alias.

14. The method of claim 8, wherein providing at least one further comprises:

if at least two of the user-definable set, the activity related set, the group set, relationship strength set, and the basic set of social network user information are determined, removing redundant social network user information among the determined sets, and providing a reduced set of social network user information.

15. A client device adapted to managing social network user information over a network, comprising:

a display configured to view social network user information; and a client application coupled to the display, that is configured to perform actions, including:

requesting a first set of social network user information associated with a requesting user;

if the request is from a requesting user associated with a user-definable category, receiving at least a user-definable second set of social network user information, wherein the user-definable category and the user-definable set are dynamically defined by the requesting user;

if the request is associated with an activity for which the requesting user is a member; receiving at least an activity related set of social network user information;

receiving a third set of social network user information; and combining the received sets into a display profile that is displayed to the requesting user, wherein combining comprises eliminating presentation of redundant information.

16. The client device of claim 15, wherein receiving at least one of the user-definable set and the activity related set, and the third set of social network user information further comprises receiving a set of social network user information, wherein at least one redundant social network user information has been removed.

17. The client device of claim 15, wherein the client device further comprises a mobile device.

18. The client device of claim 15, wherein if the request is from a user associated with a category, further comprises, determining a relationship between the user and the requesting user.

19. The client device of claim 18, wherein determining the relationship further comprises determining a degree of separation between the user and the requesting user.

20. The client device of claim 15, wherein the activity further comprises a globally defined activity selectable from at least one activity associated with dating, business, military, employment, help, advice, and alumni.

21. A server for managing social network user information over a network, comprising:

a transceiver for receiving and sending information to a computing device; and a view manager that is configured to perform actions, including:

receiving a request to view a first set of social network user information associated with a user;

if the user is a member of a category, determining a dynamically user-definable second set of social network user information;

if the user is associated with an activity for which the user is a member; determining an activity related set of social network user information;

determining a third set of social network user information;

providing at least one of the dynamically user-definable set, the activity related set, and the third set of social network user information; and combining the sets into a display profile that is displayed to the user, wherein combining comprises eliminating presentation of redundant information.

22. The server claim 21, wherein the view manager is configure to perform further actions, comprising:

if the request is from the user that is associated with a group, determining a group set of social network user information;

if the request is from the user that is associated with a predetermined relationship strength, determining a relationship strength set of social network user information; and providing at least one of the group set, and the relationship strength set, and the third set of social network user information.

23. The server of claim 21, further comprising:

a spam filter configured to employ at least one of the category, and the activity to determine whether a message is spam.

24. The server of claim 21, wherein if the request is from the user associated with the category further comprises determining a relationship between the user and the requesting user, wherein the category and the user-definable set of social network user information is definable by the requesting user.

25. The server of claim 21, wherein the activity further comprises a globally defined activity rather than a user-definable activity.

26. The server of claim 21, wherein the third set of social network user information comprises user information, including at least one of a name, an email address, an alias, and an age.

27. The server of claim 21, wherein providing at least one of the user-definable set, the activity related set, and the third set of social network user information further comprises providing the social network user information towards a mobile device.

28. A computer readable storage medium having computer readable instructions thereon for managing social network user information over a network, the computer reader instructions cause a computing device to perform actions, comprising:

transferring a request to view a first set of social network user information associated with a requesting user;

if the requesting user is a member of a category, enabling a determination of a dynamically user-definable second set of social network user information;

if the request is associated with an activity for which the requesting user is a member; enabling a determination of an activity related set of social network user information;

enabling a determination a third set of social network user information;

providing at least one of the dynamically user-definable set, the activity related set, and the third set of social network user information; and combining the sets into a display profile for display to the requesting user, wherein combining comprises eliminating presentation of redundant information.

29. The computer readable storage medium of claim 28, wherein providing at least one of further comprises providing the at least one of the social network user information towards a mobile device.

30. An apparatus for managing social network user information, comprising:

a means for receiving a plurality of social network user information;

a means for receiving a request to view the social network user information;

a means for determining an activity profile of the social network user information, if the request is related to an activity;

a means for determining a group profile of the social network user information, if the request is related to a group;

a means for determining a category profile of the social network user information, if the request is related to a category; and a means for combining a basic profile and at least zero or more of the activity profile, the group profile and the category profile that is then displayed to the requesting user, wherein combining comprises eliminating presentation of redundant information.

* * * * *

UNITED STATES PATENT AND TRADEMARK OFFICE
CERTIFICATE OF CORRECTION

PATENT NO. : 7,269,590 B2  Page 1 of 1
APPLICATION NO. : 10/832172
DATED : September 11, 2007
INVENTOR(S) : Hull et al.

It is certified that error appears in the above-identified patent and that said Letters Patent is hereby corrected as shown below:

On page 2, in field (56), under "Other Publications", in column 2, line 38, delete "1-3" and insert -- 1-3. --, therefor.

In column 2, line 46, delete "person as" and insert -- personas --, therefor.

In column 5, line 11, delete "person as," and insert -- personas, --, therefor.

In column 7, lines 51-52, delete "'close friend,'" and insert -- "close friend," --, therefor.

In column 13, line 62, in Claim 9, after "relationship between" delete "the between".

In column 15, line 15, in Claim 22, after "server" insert -- of --.

In column 15, line 16, in Claim 22, delete "configure" and insert -- configured --, therefor.

Signed and Sealed this

Eleventh Day of December, 2007

JON W. DUDAS
*Director of the United States Patent and Trademark Office*